3,403,130
CURING PROCESS FOR EPOXY RESINS
Harold Charles Stalter, Edwardsburg, Mich., assignor to Miles Laboratories, Inc., Elkhart, Ind., a corporation of Indiana
No Drawing. Filed May 17, 1966, Ser. No. 550,631
4 Claims. (Cl. 260—47)

ABSTRACT OF THE DISCLOSURE

Epoxy resins can be cured by a mixture of benzyldimethylamine and N-methyl-tetrahydrofurfurylamine. This curing catalyst mixture enables desirably long pot life to be attained.

---

This invention relates to improved curing catalyst compositions for epoxy resins. More particularly, it relates to novel mixtures of benzyldimethylamine and methyltetrahydrofurfurylamine and their use as curing catalysts for epoxy resins.

Epoxy resins are well known in the organoplastic art as being polyethers having alternating aromatic and aliphatic centers. The most common type of epoxy resin is prepared by the reaction of a dihydric phenol, such as bisphenol A, with epichlorohydrin in the presence of sodium hydroxide. Most commercial epoxy resins are formulated to contain an excess of epichlorohydrin so that the polymers formed will have terminal epoxide groups.

Curing catalysts are employed to initiate and promote self-condensation and polymerization of the resin by reaction between epoxy groups and hydroxy groups already on the resin. Such catalysts also promote reaction between the functional groups on an epoxy resin with functional groups on other modifying resins or chemicals present in the reaction system. These catalysts are employed in relatively small amounts and do not themselves serve as direct cross-linking agents.

One of the prior art curing catalysts for epoxy resins is benzyldimethylamine. It is generally used in an amount from about 2 to about 10 weight parts per hundred weight parts of resin. Other tertiary amines are known to be useful as curing catalysts for epoxy resins.

It is an object of the present invention to provide a curing catalyst for epoxy resins which has improved catalytic activity as compared to prior art curing catalysts. It is also an object of this invention to provide an improved process for curing epoxy resins.

In accordance with one feature of the present invention, a curing catalyst for epoxy resins is provided which consists essentially of a mixture of benzyldimethylamine and N-methyltetrahydrofurfurylamine. Such mixture contains from about 40 to about 80 weight percent benzyldimethylamine and from about 20 to about 60 weight percent N-methyltetrahydrofurfurylamine, said weight percents based on total weight of the mixture. Preferably the mixture contains from about 50 to about 60 weight percent benzyldimethylamine and from about 40 to about 50 weight percent N-methyltetrahydrofurfurylamine.

The benzyldimethylamine and N-methyltetrahydrofurfurylamine components of the novel curing catalyst are commercially available materials and are prepared by well-known techniques.

In accordance with another feature of the present invention, a process for curing epoxy resins is provided which comprises adding to an epoxy resin a curing catalyst which consists essentially of a mixture of benzyldimethylamine and N-methyltetrahydrofurfurylamine and maintaining the resulting mixture under desired curing conditions until a desired state of cure is obtained. The curing catalyst can be employed in amounts from about 2 to about 10 weight parts per hundred weight parts of epoxy resin, but it is preferably employed in amounts from about 3 to about 5 weight parts per hundred weight parts of epoxy resin. As used herein, the expression "cure" refers to the formation of a solid hard cross-linked polymeric mass. Such expression also includes the formation of an intermediate highly viscous gel. The present invention enables well-known curing states to be obtained in an improved fashion as compared to the results achieved with prior art curing catalysts. The present invention enables substantial resin viscosity increases to be obtained under room temperature conditions. Curing temperatures of 50° C. or higher may also be used if desired. The curing catalyst used in the novel curing process is a mixture containing from about 40 to about 80 weight percent benzyldimethylamine and from about 20 to about 60 weight percent N-methyltetrahydrofurfurylamine, said weight percents based on the total weight of the mixture. Preferably the curing catalyst mixture contains from about 50 to about 60 weight percent benzyldimethylamine and from about 40 to about 50 weight percent N-methyltetrahydrofurfurylamine.

Use of the novel curing catalyst in combination with an epoxy resin is described in further detail in the following examples:

EXAMPLE 1

Separate 100 g. portions of an epoxy resin were mixed with 5 grams each of an amine curing catalyst. The epoxy resin was a diglycidyl ether of bisphenol A having a molecular weight of 350–400 and an epoxide equivalent (grams of resin containing one gram-equivalent of epoxide) of 185–192 and marketed by the Shell Chemical Company under the trade name Epon 828. The amine curing catalysts were benzyldimethylamine, N-methyltetrahydrofurfurylamine and various mixtures of benzyldimethylamine and N-methyltetrahydrofurfurylamine. The resulting epoxy resin-curing catalyst mixtures were then allowed to stand at room temperature (about 26–27° C.) for several hours. Separate mixtures were also heated in an oven at 50° C. for several hours. The viscosities of the room temperature samples were measured at various time intervals. The viscosities after 2 hrs. were measured with a Brookfield Viscometer using a No. 7 spindle at 20 r.p.m. The viscosities after 5 hrs. were measured with a No. 7 spindle at 10 r.p.m. The samples heated in the oven were also observed at various time intervals. The results were as follows:

| Curing Catalyst | Viscosity after 2 hrs. at 26° C. | Viscosity after 5 hrs. at 27° C. | Samples after 1.5 hrs. at 50° C. | Samples after 4.5 hrs. at 50° C. |
|---|---|---|---|---|
| BDMA [1] | 40,000 | 146,000 | Rubbery and tacky | Slightly tacky. |
| 80% BDMA, 20% MTHFA [2] | 55,000 | 248,000 | Hard and tacky | Very slightly tacky. |
| 60% BDMA, 40% MTHFA | 154,000 | >400,000 | Solid and slightly tacky | Solid with no tackiness. |
| 50% BDMA, 50% MTHFA | 140,000 | >400,000 | Hard and tacky | Do. |
| 40% BDMA, 60% MTHFA | 51,000 | 176,000 | Solid but very tacky | Tacky. |
| 20% BDMA, 80% MTHFA | 35,000 | 72,000 | Flowing | Rubbery. |
| MTHFA | 30,000 | 54,000 | ____do____ | Very soft. |

[1] BDMA=benzyldimethylamine.
[2] MTHFA=N-methyltetrahydrofurfurylamine.

It can be seen from the above data that the curing catalyst mixtures consisting essentially of from about 40 to about 80 weight percent benzyldimethylamine and from about 20 to about 60 weight percent N-methyltetrahydrofurfurylamine have improved curing characteristics as compared to those of benzyldimethylamine alone. These improved curing characteristics are indicated by the higher viscosities of the room temperature samples and by the increased hardness and reduced tackiness of the oven heated samples.

Further utility of the present invention is shown by the following example:

EXAMPLE 2

A 100 g. quantity of Epon 828 epoxy resin was mixed with 3 g. of a curing catalyst mixture consisting essentially of 60 weight percent benzyldimethylamine and 40 weight percent methyltetrahydrofurfurylamine. A separate 100 g. quantity of Epon 828 resin was mixed with 3 g. of a curing catalyst mixture consisting essentially of 50 weight percent benzyldimethylamine and 50 weight percent methyltetrahydrofurfurylamine. These two epoxy resin-curing catalyst mixtures were then heated in an oven at 50° C. for 31 hr. The resulting products were hard and showed no appreciable discoloration or softening at this temperature. The samples were then placed in an oven at 150–200° C. for 18 hr. and no softening was observed; only slight discoloration was noted. The samples were then cooled to room temperature and broken into smaller pieces. Weighed portions of these samples were immersed in acetone for 24 hr. at 20–27° C. After 24 hr. the samples were dried and weighed. The weight loss of all the samples was about 0.23–0.39% indicating good solvent resistance.

Other useful properties of the novel curing catalysts of the present invention are shown in the following example.

EXAMPLE 3

Separate 50 g. portions of Epon 828 were mixed with 2.5 g. each of benzyldimethylamine, diethylenetriamine, mixture of 60 weight percent benzyldimethylamine and 40 weight percent N-methyltetrahydrofurfurylamine, and a mixture of 50 weight percent benzyldimethylamine and 50 weight percent N - methyltetrahydrofurfurylamine. Each of the resin-amine curing catalyst mixtures was then placed in a 100° C. constant temperature oil bath and the temperatures of the resin-amine curing catalyst mixtures were measured against time. Within 5 min. the temperature of the mixture containing the prior art diethylenetriamine curing catalyst rose to 120° C. and the mixture gelled. Within 8 min. the temperature reached a peak exotherm of 156° C. and then dropped to 100° C. within a total of 30 min. This high exotherm causes discoloration of the resin and the rapid gel formation reduces the pot life of the resin-catalyst mixture.

The resin-amine curing catalyst mixture containing the prior art benzyldimethylamine curing catalyst had a temperature rise to 111° C. and gel formation within 24 min. and a peak exotherm of 121° C. after 35 min. The temperature gradually decreased to 100° C. after a total of 70 min.

In contrast to the performance of the prior art curing catalysts, the resin system containing the curing catalyst mixture of 60 weight percent benzyldimethylamine and 40 weight percent N-methyltetrahydrofurfurylamine had gel formation at 106° C. after 30 min. and a peak exotherm of 110° C. after 43 min. The resin system containing the curing catalyst mixture of 50 weight percent benzyldimethylamine and 50 weight percent N-methyltetrahydrofurfurylamine had gel formation at 100° C. after 37 min. and a peak exotherm of 105° C. after 54 min. The temperatures of both of the resin-catalyst mixtures containing the novel curing catalyst mixtures gradually decreased to 100° C. after a total of 70 min.

It can be seen from the above data that the novel curing catalysts and curing process of the present invention produce desirable low exotherms and desirably long pot life (time to form gels) as compared to prior art catalyst systems.

It should be emphasized that while the novel curing catalysts of the present invention have curing activity at temperatures of 100° C. and below wherein substantial viscosity increases are observed, such curing does not take place at an excessive rate so as to undesirably reduce the pot life of the epoxy resin. The resulting epoxy resin-curing catalyst systems can therefore be easily handled under commercial conditions to achieve eventual desired curing states.

While the above examples all employed Epon 828 epoxy resin, it is understood that the novel curing catalysts and curing process of the present invention can be used with any other epoxy resin to achieve improved curing results.

What is claimed is:

1. A process for curing epoxy resins which comprises adding to an epoxy resin having a plurality of 1,2-epoxide groups a curing catalyst which consists essentially of a mixture of from about 40 to about 80 weight percent benzyldimethylamine and from about 20 to about 60 weight percent N-methyltetrahydrofurfurylamine, said weight percents based on total weight of the curing catalyst mixture, and maintaining the resulting mixture under desired curing conditions until a desired state of cure is obtained.

2. A process according to claim 1 wherein the curing catalyst consists essentially of a mixture of from about 50 to about 60 weight percent benzyldimethylamine and from about 40 to about 50 weight percent N-methyltetrahydrofurfurylamine, said weight percents based on total weight of the curing catalyst mixture.

3. A process according to claim 1 wherein the curing catalyst is present in an amount from about 2 to about 10 weight parts per hundred weight parts of epoxy resin.

4. A process according to claim 1 wherein the curing catalyst is present in an amount from about 3 to about 5 weight parts per hundred weight parts of epoxy resin.

References Cited

UNITED STATES PATENTS

| | | | |
|---|---|---|---|
| 2,553,718 | 5/1951 | Newey et al. | 260—47 |
| 3,028,342 | 4/1962 | Katz et al. | 260—47 |

WILLIAM H. SHORT, *Primary Examiner.*

T. D. KERWIN, *Assistant Examiner.*